May 13, 1924.　　　　G. E. STEVENS　　　　1,494,033
EYESHIELD MIRROR
Filed Dec. 28, 1921
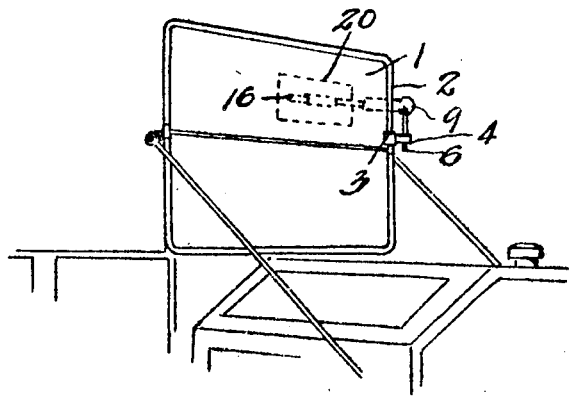
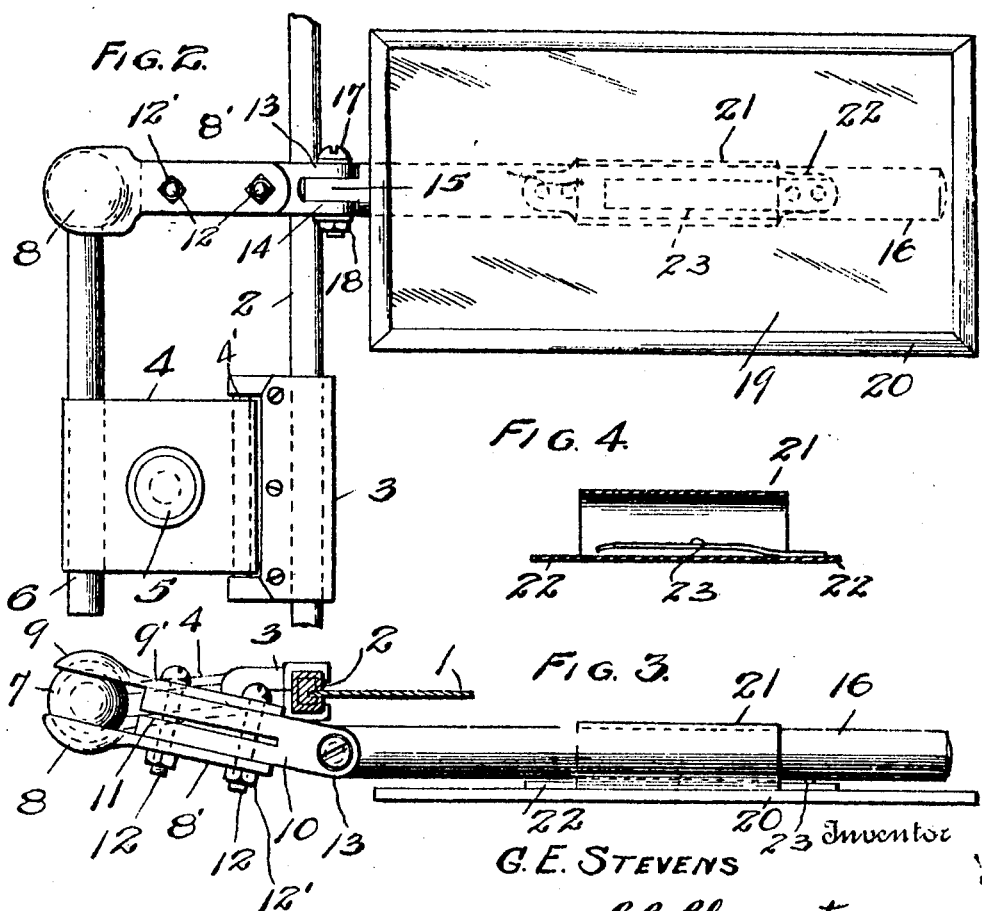
G. E. STEVENS
C. C. Clements
Attorney Patented May 13, 1924.

1,494,033

UNITED STATES PATENT OFFICE.

GEORGE E. STEVENS, OF ABERDEEN, SOUTH DAKOTA.

EYESHIELD MIRROR.

Application filed December 28, 1921. Serial No. 525,391.

*To all whom it may concern:*

Be it known that I, GEORGE E. STEVENS, a citizen of the United States of America, residing at Aberdeen, in the county of Brown and State of South Dakota, have invented certain new and useful Improvements in Eyeshield Mirrors, of which the following is a specification.

My present invention relates to an improved eye shield mirror for use in connection with the front of an automobile, and preferably designed for use in conjunction with the standard forms of windshields of automotive vehicles. The primary object of the invention is the provision of a combined mirror and eye-shield which may be adjusted with facility and to various positions, in front of the driver, to protect the eyes from the sun's rays or from the direct rays of light emanating from the lamps of an approaching automobile on the highway. The device of the invention may also be laterally adjusted with relation to the windshield or other support to perform the function of a mirror for enabling the driver of an automobile to ascertain by a forward glance, the condition of traffic at the rear of his car. With these ends in view my invention consists in certain novel combinations and arrangements of parts involving the mirror-shield and its adjustable supporting bracket, as will be hereinafter more specifically set forth and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view showing an automobile windshield of well known type, and the subject matter of my invention combined therewith as an eye-shield.

Figure 2 is an enlarged view of the device of the invention shown in elevation.

Figure 3 is a top or edge view of the device as seen in Figure 2. Fig. 4 is a sectional detail of the sleeve.

In the preferred form of the invention as shown in the drawings, for purposes of illustration I have indicated a windshield 1, one of its side bars 2 extending vertically at the side thereof, and 3 indicates a supporting clamp bracket. The bracket may be of well known type involving complementary plates for clamping on the side bar 2 of the windshield, and a second pair of complementary clamp plates 4, controlled by the set screw 5. It will be apparent that the bracket may be adjusted vertically on the side bar 2, or on other similar support, for the purpose of locating the device in desired position for different uses.

Secured within the clamp plates 4 is a round post 6 of correct diameter and length, which may be located at the outer side of the windshield as shown in the drawings, or the plates 4 may be swung on their pivotal connection 4' with the fixed or stationary plates 3, to bring the post at the inner side of the side bar 2 of the windshield. At its upper end this post is provided with a head or ball 7 of spherical shape, and it will be apparent that the post and its head may be vertically adjusted with relation to the clamp plates 4.

The spherical head 7 forms part of a universal joint of which the two clamp jaws 8 and 9 form a part, these jaws being provided with concave friction surfaces to engage the periphery of the ball or head, and each fashioned with an arm as 8' and 9'. The arms are spaced apart, and arranged in parallelism at the sides of a split clamp bar 10 that is fashioned with a longitudinal slot 11. The split or bifurcated bar is perforated, and the arms 8' and 9' are provided with complementary openings for the reception of a pair of transversely arranged clamp bolts 12, 12, having nuts 12'. Obviously the bar 10 possesses resiliency because of its slot 11, and therefore when the nuts 12' are tightened the two jaws 8 and 9 will be caused to frictionally engage and clasp the head to hold the bar 10 and head in rigid relation. The jaws are capable of a wide range of adjustment with respect to the head, and the bar 10 may thus be moved on the head to practically any angular position with respect thereto. At its free end the split bar 10 is formed with spaced ears 13 and 14 to receive the perforated ear 15 on the mirror-rod 16, and a pivot screw 17 is passed through these three ears and secured by a nut as 18.

The mirror rod is adapted to directly support the detachable mirror 19 that forms the eye-shield, and is provided with a usual frame 20. On the back of the mirror frame is secured a friction sleeve 21, extending longitudinally of the mirror frame and secured thereto as by screws passing through the end lugs 22 of the sleeve.

Within the sleeve 21 is located a flat spring plate 23 having its fixed end attached to one of the lugs 22 of the sleeve, which plate performs the function of a spring friction member for engagement with the mirror rod for holding the mirror in place.

The sleeve 21 is preferably of metal, and the mirror rod 16 may be of wood, or other suitable material. It will be apparent that the sleeve 21 of the mirror is slipped over the free end of the post or rod 16, and that the friction between the sleeve and its spring plate 23 and rod is sufficient to hold the mirror in position at any point throughout the length of the rod and that the mirror may also be adjusted angularly on the rod as required. The mirror may be withdrawn from the rod and used as a hand mirror when required.

From the above description taken in connection with my drawings it will be apparent that the mirror or eye-shield is capable of numerous adjustments, in both horizontal and vertical planes, and angular adjustments of the mirror on its rod may be secured; the rod and mirror may be swung for horizontal adjustment on the hinge or pivot bolt 17; the mirror and bar 10 with jaws 8 and 9 may be adjusted in many ways with relation to the head 7; the post 6 is vertically adjustable in the bracket plates 4, and the bracket may be adjusted horizontally and vertically of the side bar 2 of the windshield. By swinging the mirror through an arc of 180 degrees, on the ball 7 as a center, the mirror may be turned to position and extend laterally from the windshield or other support, or the mirror may be swung toward the driver on the ball as a center and then swung backwardly on the pivot bolt 17 to bring the mirror directly in front of the driver, as desired, and numerous other adjustments may be secured as will readily be understood. In this manner the device is capable of many adjustments for fulfilling the purposes of my invention, and the driver may with facility and dexterity move the device to desired position.

Having thus fully described my invention what I claim is:—

In a device of the character described adapted to be attached to a windshield post, an adjustable bracket thereon and an adjustable post in said bracket, a spherical head on said post, a bifurcated bar, a pair of complementary jaws on said bar to engage said head and a clamp bolt in said bifurcated bar, a pair of perforated ears at the free end of said bar, a mirror rod having a perforated ear and a pivot bolt passed through said perforated ears, a combined mirror and eye-shield, and a friction sleeve on said mirror encasing said rod.

In testimony whereof I affix my signature.

GEORGE E. STEVENS.